Nov. 21, 1933.    O. W. BRENIZER    1,936,185
WIRE CONNECTING DEVICE
Filed July 20, 1932    2 Sheets-Sheet 1

Inventor:
Orson W. Brenizer
by A. V. Groupy
Attorney

Nov. 21, 1933.    O. W. BRENIZER    1,936,185
WIRE CONNECTING DEVICE
Filed July 20, 1932    2 Sheets-Sheet 2

Inventor:
Orson W. Brenizer
by A. V. Groupy
Attorney

Patented Nov. 21, 1933

1,936,185

UNITED STATES PATENT OFFICE 1,936,185

WIRE CONNECTING DEVICE

Orson W. Brenizer, Philadelphia, Pa., assignor of one-fourth to Andrew V. Groupe, Philadelphia, Pa.

Application July 20, 1932. Serial No. 623,501

7 Claims. (Cl. 173—263)

This invention relates to improvements in wire connecting devices particularly adapted for use in making joints in electrical conductors or wires used for telephone, telegraph and other purposes.

An object of the invention is to provide a novel and efficient connecting device by means of which a strong and durable joint having many advantageous characteristics may be made.

Another object of the invention is to provide a means for making a joint in electrical wires which, in addition to being strong and durable, shall have the desired characteristics as to electrical conductivity and resistance.

The invention resides in the novel construction, combination and arrangement of parts of the connecting device as will be hereinafter described and claimed.

In the accompanying drawings, illustrating the invention,

Figure 1:
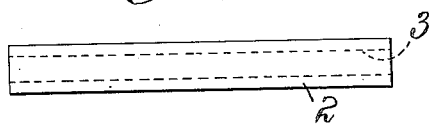
Figure 1 is a side view of my improved wire connecting device.
Figure 2:
Figure 2 is an end view thereof.
Figure 3:
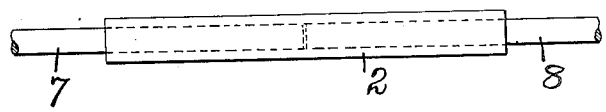
Figure 3 is a side view of a wire joint formed by the meeting ends of two wires and the connecting device shown in Figs. 1 and 2.
Figure 4:
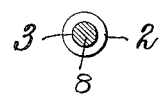
Figure 4 is an end view of the parts shown in Fig. 3, the wire being shown in section.

Referring to the drawings, my improved connecting device comprises an exterior tubular body or sleeve 2 which is formed of suitable malleable metal, and 3 an interior tubular body of thinner construction than the exterior body 2 and formed of brittle metal which is harder than the malleable metal of the exterior body or sleeve.

Figure 11:
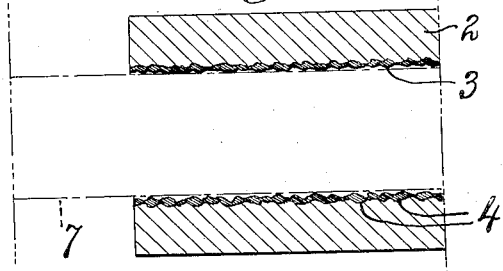
Figure 11 is a view of a portion of the sleeve similar to Figs. 7 and 9, after the brittle metal has been applied to the roughened inner surface of the sleeve, showing, by dot-and-dash lines, a portion of a wire within the sleeve and the relation of the wire to the parts of the sleeve before the sleeve has been elongated and compressed upon the wire.
Figure 12:
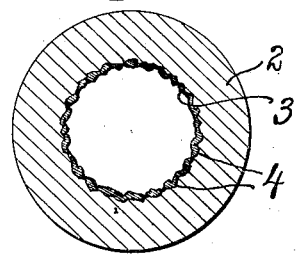
Figure 12 is a transverse section of the sleeve shown in Fig. 11.

The inner wall of the body 2 is provided with interstices 4 in which parts of the metal of the interior body 3 are embedded, and the metal forming the body 3 is of uneven thickness and ununiform formation, as clearly shown in Figs. 11 and 12.

In Figs. 3, 4, 13 and 14, I have shown the condition of the connecting device after it has been used to make a joint connecting the meeting end portions of two wires 7 and 8 which are formed of metal which is softer than the brittle metal forming the interior tubular body 2.

Figure 5:
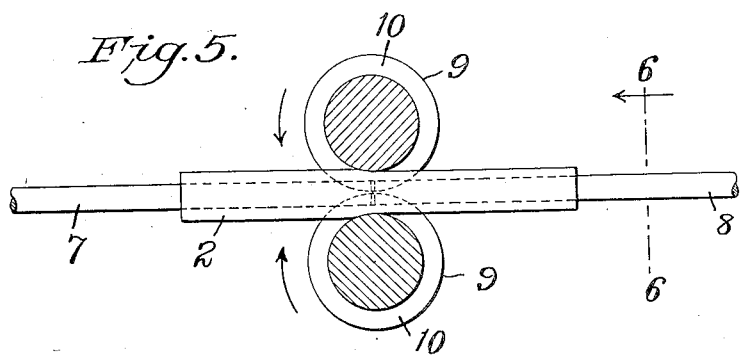
Figure 5 is a view illustrating the method of forming the joint by the aid of two rollers which are shown in section, on line 5—5 of Fig. 6.
Figure 6:
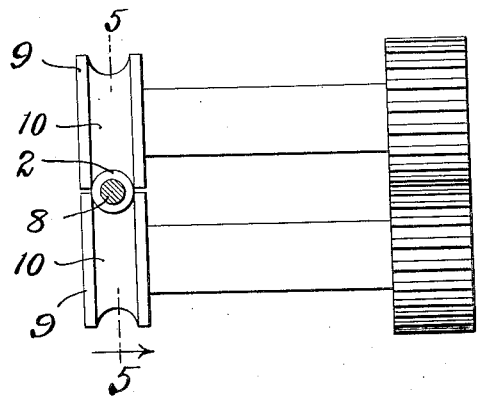
Figure 6 is a section on line 6—6 of Fig. 5, showing the parts illustrated in Fig. 5 as seen at right angles thereto.
Figure 7:
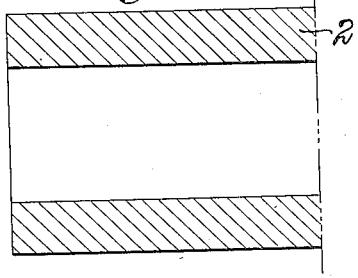
Figure 7 is a longitudinal section, greatly enlarged, of one end portion of the connecting device or sleeve, before the roughening of the inner surface thereof.
Figure 8:
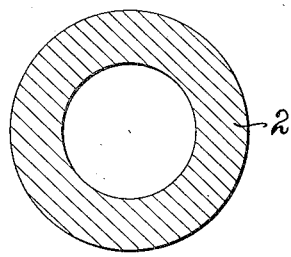
Figure 8 is a transverse section of the sleeve shown in Fig. 7.
Figure 13:
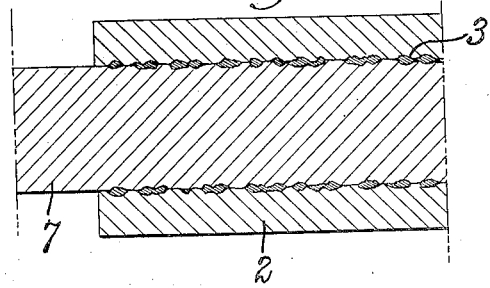
Figure 13 is a view of the sleeve and wire similar to Fig. 11, showing the wire in full lines and in section, and showing the condition of the parts after the sleeve has been elongated and compressed upon the wire.
Figure 14:
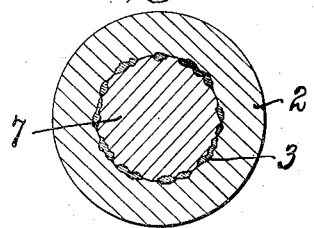
Figure 14 is a transverse section of the sleeve and wire shown in Fig. 13.

In forming the joint illustrated in Figs. 3, 4, 13 and 14, the end portions of the wires 7 and 8 are first inserted into the respective end portions of the sleeve 2, so that each wire 7 and 8 is related to the sleeve 2 and the inner body 3 of brittle metal as the wire 7, shown by dot-and-dash lines in Fig. 11, is related thereto, the interior diameter of body 3 being sufficient to permit the wires easily to be inserted therein. After the wires 7 and 8 have been inserted into the sleeve 2, the sleeve and the wires therein are compressed by any suitable means, and, for this purpose, I have illustrated two grooved rollers 9 which receive the wires and sleeve between them and which are rotated in the directions of the arrows in Fig. 5 and whch are moved longitudinally of the sleeve from the right to the left of Fig. 5, while they are being rotated. The space formed by and between the wall of the grooves 10 of the rollers 9 is such as to compress and elongate the sleeve 2 and thereby force it into close relationship with the end portions of the wires 7 and 8 therein. As the wall of the sleeve 2 is thus elongated and forced into close relationship with the wires, the action of the rollers 9 fractures or breaks the brittle metal forming the body 3 into fragments, and embeds the fragments in the wall of the sleeve 2 and in the wires 7 and 8, as shown in Figs. 13 and 14, and thereby forms a joint which is as strong or stronger than the wires themselves.

The ununiform formation and the uneven thickness of the brittle metal forming the body 3 enables the rolling action of the rollers 9 easily to break it into fragments which form effective locks or anchors embedded in both the sleeve and the wires for resisting any longitudinal pull which tends to withdraw the end portions of the wires from within the sleeve; and the interstices 4 in the sleeve 2 not only hold and retain the brittle metal within the sleeve before the insertion of the wire ends into the same but they also form cavities in which the fragments of brittle metal may easily find lodgment when the sleeve is passed between the rollers in forming the joint.

When the invention is used to form a joint in electrical conductors or wires, the sleeve 2 would be formed of copper, the wires 7 and 8 would be formed of copper, and the brittle metal of the inner body 3 would be formed of a suitable metal or alloy which would be a good electrical conductor and considerably harder than the malleable copper sleeve and copper wires, and I have found that an alloy of nickel and chromium of approximately eighty (80) parts nickel and twenty (20) parts chromium, gives very good results in this connection and provides a joint which has all the desired characteristics as to electrical conductivity and resistance.

An important advantage resulting from my invention, when it is used in a joint for electrical conductors, is the copper to copper contact between the sleeve 2 and the wires 7 and 8 between the fragments of the brittle metal. This feature is clearly illustrated in Figs. 13 and 14.

Figure 9:
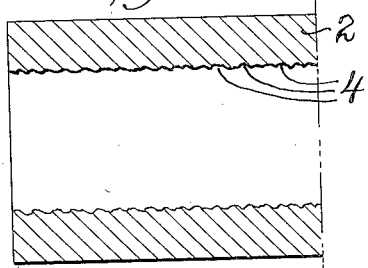
Figure 9 is a view of a portion of the sleeve similar to Fig. 7, after the roughening of the inner surface of the sleeve.
Figure 10:
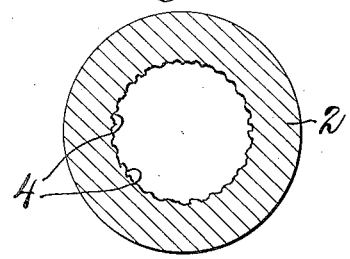
Figure 10 is a transverse section of the sleeve shown in Fig. 9.

In producing the connecting device shown in Figs. 1, 2, 11 and 12, the tubular body or sleeve 2 is first produced in seamless form by the well known method of producing such articles. The interior wall of the sleeve is then roughened to provide the interstices 4 therein, as shown in Figs. 9 and 10, by the well known sand blasting operation in which the sand is directed against the inner wall of the sleeve. After the interior of the sleeve has been thus roughened, the brittle metal forming the inner coating or body is sprayed, in a molten condition, into the sleeve from the respective open ends thereof and thereby deposited upon the roughened interior wall of the sleeve in approximately the condition illustrated in Figs. 11 and 12. The brittle metal is thus applied to the interior of the sleeve by the well known method of spraying molten metal.

I claim:

1. An electrical wire connecting sleeve comprising a tubular body formed of copper whose inner wall carries a wire engaging element formed of an alloy of nickel and chromium.

2. An electrical wire connecting sleeve comprising a tubular body formed of copper whose inner wall carries a frangible coating of uneven thickness formed of non-corrodible metal which is harder than the copper.

3. An electrical wire connecting sleeve comprising a tubular body formed of copper whose inner wall carries a frangible coating of uneven thickness formed of an alloy of nickel and chromium.

4. An electrical wire connecting sleeve comprising an exterior tubular body of greater length than its diameter and formed of malleable metal, and an interior tubular body of thinner construction than the exterior body and formed of brittle metal of uneven thickness and greater hardness than the metal forming the exterior body and being supported by the inner wall of the exterior body in frangible contact therewith.

5. An electrical wire connecting sleeve comprising an exterior tubular body of greater length than its diameter and formed of malleable metal and having a roughened inner surface, and an interior tubular body of thinner construction than the exterior body and formed of brittle metal of uneven thickness embedded in interstices in said roughened inner surface and being of greater hardness than the metal forming the exterior body and being supported by the inner wall of the exterior body in frangible contact therewith.

6. An electrical wire connecting sleeve comprising a tubular body formed of malleable metal and having particles of metal of greater hardness than the metal of said body sprayed upon the interior surface thereof and supported thereby in frangible contact therewith.

7. An electrical wire connecting sleeve comprising a tubular body formed of malleable metal and having a roughened inner surface and having particles of metal of greater hardness than the metal of said body sprayed upon the roughened inner surface thereof and supported thereby in frangible contact therewith.

ORSON W. BRENIZER.